May 21, 1968      O. J. WOLFER      3,384,145

TIRE

Filed Nov. 8, 1965

INVENTOR.
OTTO J. WOLFER
BY
ATTORNEY.

United States Patent Office 3,384,145
Patented May 21, 1968

3,384,145
TIRE
Otto J. Wolfer, Park Ridge, Ill., assignor to Union Oil Company of California, Los Angeles, Calif., a corporation of California
Filed Nov. 8, 1965, Ser. No. 506,727
14 Claims. (Cl. 152—330)

ABSTRACT OF THE DISCLOSURE

A vehicle tire having a tread comprised of cross lugs or ribs defining voids therebetween which includes a tread depth reference marker comprised of at least one depression in the lowermost surface of one of the voids between the lugs and adapted to receive a tread depth measuring instrument.

This invention relates to vehicle tires and more particularly to those tires which do not have a circumferential groove at the approximate centerline of the tire. More specifically, the invention pertains to rubber truck and/or snow tires having lateral cleats or lugs and in tires having a center circumferential rib at the approximate centerline of the tire from which lugs or cleats radiate therefrom to the outer shoulder of the tire.

In tires having a center groove, means whereby the remaining tread of a tire may be ascertained is readily available in that a tread depth measuring instrument may be inserted in the central circumferential groove. However, those instances where cleats or lateral lugs form the tread surface of the tire, it is difficult if not impossible to obtain uniform tread depth measurements because no one point on the tire is utilized consistently in making the measurements. The uniform measurement of remaining tread by the same or different individuals becomes especially important from the fleet owners point of view in carrying out programs of preventive maintenance or on the ascertainment of tire performance. More specifically, it is often desirous to know the percentage of useful life remaining in a tread so that operating costs may be assessed or to determine from the condition of wear whether or not wheels may be misaligned or whether wear has reached a point where a tire is unsafe.

The principal object of the present invention is to provide tire wear measuring means incorporated in the body of a tire from which uniform and consistent readings may be taken with tread measuring instruments.

Another object of the invention is to provide means in a tire having cleats or cross lugs whereby a definite location is provided from which tread depth measurements may be uniformly taken. Still another object of the invention is to provide spaced depressions molded in the void surfaces of a tire body wherein the voids are formed by lateral cleats or lugs and wherein the depressions are of sufficient size to receive a tread depth measuring instrument. Still another object of this invention is to provide a means for measuring the remaining tread of a tire having a circumferential center rib at the approximate centerline of the tire from which uniform correlative measurements may be made during the lifetime of the tire.

Figure 1:
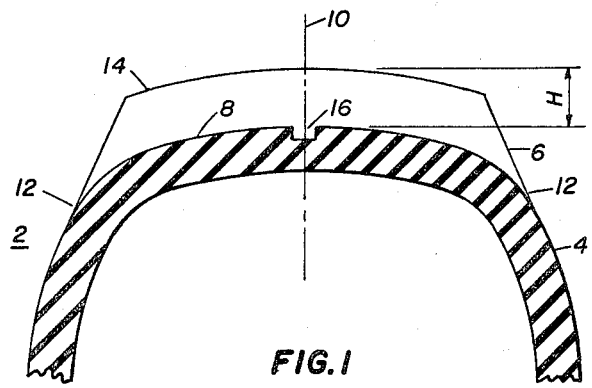
Figure 2:
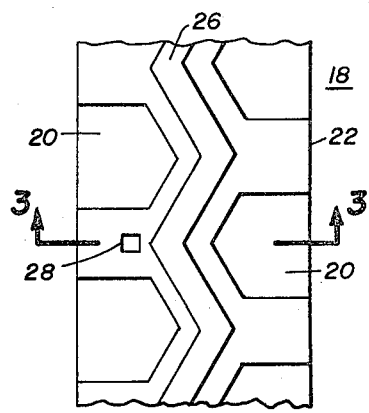
Figure 3:
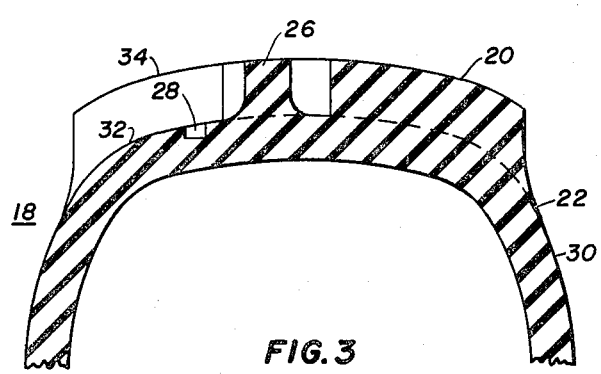
Figure 5:
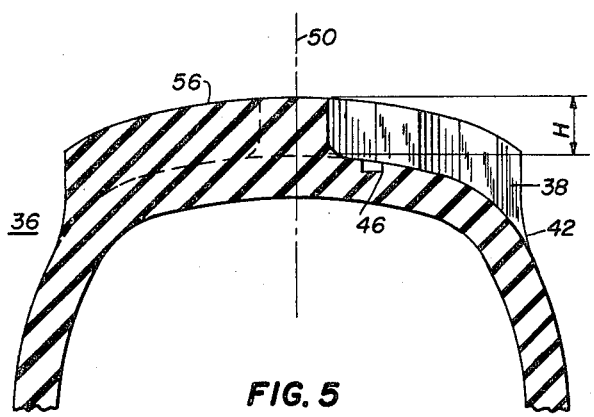
Figure 4:
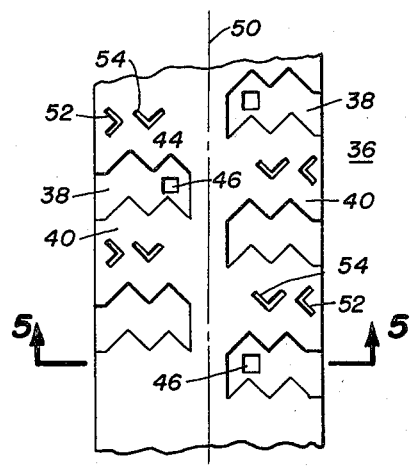

Further objects, advantages and salient features will become more apparent from the following commentary, the appended claims and the accompanying drawing in which:

FIGURE 1 is a partial cross section of a tire having cross lugs or lateral cleats;
FIGURE 2 is a top plan view of a fragment of a tire;
FIGURE 3 is a section taken on the line 3—3 of FIGURE 2;
FIGURE 4 is a top plan view of a fragment of a tire showing the invention in an alternative form of a tire design; and
FIGURE 5 is a section taken on line 5—5 of FIGURE 4.

Referring in detail to FIGURE 1, a conventional tire 2 has molded onto the tire body 4 cleats or cross lugs 6 forming between cross lugs 6 void surfaces 8. The cleats extend laterally across the tire 2 and radiate from either side of the centerline 10 of tire 2 outward towards shoulders 12 thereby forming tread surface 14. The distance H designates the height or depth of the tread formed by cross lugs 6 from the uppermost tread surface 14 to void surface 8 when the tire is new. Now in accordance with this invention, a depression 16 is provided in the void surface 8 between the cleat or lug at the approximate centerline 10 of tire 2 from which uniform measurements may be taken during the life of the tire merely by inserting a tread measuring instrument, not shown, into depression 16. All subsequent measurements of the remaining tread will be correlative and consistent since depression 16 will provide a uniform point from which measurements may be taken.

Referring to FIGURE 2, tire 18 has cross lugs 20 extending from shoulder 22 of the tire towards zig-zag circumferential rib 26. The placement of depression 28 as close to the mid-point as possible of tire 18 provides a point from which uniform and consistent measurements may be made of remaining tire tread in a tire having a circumferential central rib generally found in heavy duty tires such as are used in the trucking industry.

Referring to FIGURE 3, the disposition of depression 28 is shown as being molded in the surface of the body 30 of tire 18 and clearly points up the necessity of having a point such as depression 28 provided for making measurements in such a tire. The cross lugs or cleats 20, extending from central circumferential rib 26 towards shoulder 22 of tire body 30, form a tread surface 34 which is arcual with reference to the uppermost surface 32 which is the surface of the tire or void surface formed by cross lugs 20. Since tread surface 34 will wear the fastest near the shoulder of tire 18, it can be seen that measurements taken along the void surface 32 will be inconsistent and non-uniform mainly because of the varying height of cross lug 20 from shoulder 22 to central rib 26. However depression 28 provides a point from which consistent sequential readings of tread life may be taken. Preferably depression 28 is located as close as possible to central rib 26 since the tread depth at the approximate centerline of the tire will be of greater magnitude after wear than that tread depth in proximity to shoulder 22.

Referring to FIGURES 4 and 5, still another type of tire is shown wherein tire 36 has zig-zag voids 38 thereby forming cross lug ribs or lateral cleats 40 extending from circumferential main rib 44. Depressions 46 are shown alternately disposed in the void surface 38 of tire 36 in proximity to centerline 50 or main circumferential rib 44. Tire 36 may have angled slots such as 52 and 54 on each cleat to provide additional traction to tire tread surface 56. It will be seen that tread surface 56 has a maximum height, with respect to void surface 38, at a point nearest shoulder 42 or furthest from main rib 50. However, it is desirable to measure the tread depth from a tangential line normal to void surface 38 at a point closest to main rib 50 and perpendicular to the normal tangent in order to determine tread depth since the tread at this point wears less rapidly.

The method of forming the depression in the void surface of the tire body from which uniform measurements may be made is not critical and the depression may be molded in the tire body per se or may be cut or grooved into the void surface after the tire has been molded. Obviously, the preferred method is to mold the depression in the tire body as the tire is being formed. The exact placement of the depression likewise is not critical, although it is preferred to dispose the depression in the void surface at a point as close as possible to the approximate centerline of the tire or as close as possible to the central rib of the tire so as to provide a maximum tread depth reading once the tire has been subjected to extensive wear. Tread design, void size and purely engineering expedient factors will influence exact depression placement. The number of the depressions provided in the tire is not important although it is readily apparent that a multiplicity of the depressions would provide no useful purpose, it being only important that they are provided to be preferably visible to personnel taking measurements and that they be conveniently located around the peripheral surface of the void surface so as to be readily available to receive the tread depth measuring instrument.

The size of the depression is not critical and ordinarily the dimensions will be dictated by thread design, ease of slotting or molding, etc., but in the case of the ordinary truck tire having a central rib and cross lugs, the length of the depression will be about .15 to .30 inch whereas the width will generally fall within the range of .10 to .15 inch with a depression depth of about $\frac{1}{32}$ to $\frac{2}{32}$ of an inch measured from the upper surface of the void surface. The tread design or type of cleats or cross lugs utilized are those that are generally known in the art and are not critical and the invention may be utilized in all types of tires of various materials of construction.

It is also readily apparent that any number of the depressions or means from which tread depth measurements may be made may be provided in the periphery of the tire although a great multitude of the depressions may be in some instances cause the concentration of stress and strain and may also provide some dynamic imbalance to the tire. However, these are considerations which those of ordinary skill in the art are readily obvious and further discussion pertaining to the various obvious modifications of the herein disclosed invention is unwarranted.

The embodiments of the invention in which an exclusive property or privilege is claimed are defined as follows:

1. In a vehicle tire having a tread thereon subject to wear, said tread comprising a plurality of spaced cross lug ribs defining voids therebetween, the improvement which comprises at least one depression formed in the lowermost surface of one of said voids between said lugs, said depression being limited in size and depth to receive a tread depth measuring instrument.

2. The tire in accordance with claim 1 wherein said cross lug ribs extend from either side of a main circumferential rib at the approximate centerline of said tire and a plurality of said depressions are circumferentially spaced in juxtaposition to said circumferential rib around said tire as close to said circumferential rib as possible.

3. The tire in accordance with claim 2 wherein said lugs have a zig-zag configuration extending from said main circumferential rib towards the shoulder of said tire.

4. The tire in accordance with claim 2 wherein said circumferential rib has a zig-zag configuration.

5. The tire in accordance with claim 2 wherein the void surface in which said depressions are disposed tapers from said main circumferential rib to the shoulder of said tire and said depressions are located as close to said circumferential rib as possible.

6. In a vehicle tire having spaced lateral cleats radiating from a circumferential rib towards the shoulder of said tire thereby forming a tread surface, said cleats defining void surfaces therebetween, the improvement which comprises at least one depression in at least one void bottom surface, said depression being in juxtaposition to said rib and being of limited size to receive a tread depth measuring instrument whereby uniform measurements of the tread depth may be made.

7. The tire in accordance with claim 6 wherein said cleats are of zig-zag design and the voids thereby defined are of congruent configuration.

8. The tire in accordance with claim 7 wherein said depressions are molded in said bottom void surface and are disposed in alternate voids.

9. The tire in accordance with claim 6 wherein said cleats have a maximum height with respect to said bottom void surfaces at a point furthest from said rib.

10. The tire in accordance with claim 6 wherein said depression is disposed at a point furthest from said shoulder whereby the greatest depth of said cleat may be measured after said tread surface has been subjected to wear.

11. The tire in accordance with claim 1 wherein said depression is located at the centerline of the tire.

12. The tire in accordance with claim 1 wherein said depression is disposed in the lowermost surface of every other void.

13. The tire in accordance with claim 1 wherein said depression has a depth of about 0.06 inch.

14. The tire in accordance with claim 6 wherein said circumferential rib has a zig-zag configuration.

References Cited

UNITED STATES PATENTS 1,701,482   2/1929   Hower _____ 152—209

ARTHUR L. LA POINT, *Primary Examiner.*

C. B. LYON, *Assistant Examiner.*